US010669437B2

(12) United States Patent
Cox et al.

(10) Patent No.: US 10,669,437 B2
(45) Date of Patent: Jun. 2, 2020

(54) POWDER BED FUSING THERMOPLASTIC POLYMERS

(71) Applicant: SABIC Global Technologies B.V., Bergen op Zoom (NL)

(72) Inventors: Keith E. Cox, Newburgh, IN (US); Franciscus Maria Huijs, Breda (NL); Viswanathan Kalyanaraman, Newburgh, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 597 days.

(21) Appl. No.: 15/302,272

(22) PCT Filed: Apr. 6, 2015

(86) PCT No.: PCT/US2015/024452
§ 371 (c)(1),
(2) Date: Oct. 6, 2016

(87) PCT Pub. No.: WO2015/157148
PCT Pub. Date: Oct. 15, 2015

(65) Prior Publication Data
US 2017/0028632 A1 Feb. 2, 2017

Related U.S. Application Data

(60) Provisional application No. 61/976,110, filed on Apr. 7, 2014.

(51) Int. Cl.
*C09D 7/61* (2018.01)
*B33Y 70/00* (2020.01)
(Continued)

(52) U.S. Cl.
CPC .................. *C09D 7/61* (2018.01); *B29B 9/12* (2013.01); *B29B 9/16* (2013.01); *B29C 64/153* (2017.08);
(Continued)

(58) Field of Classification Search
CPC .................................................. B29C 67/0077
(Continued)

(56) References Cited

U.S. PATENT DOCUMENTS 4,404,350 A    9/1983  Ryang
4,603,194 A *  7/1986  Mendiratta ............... C08F 6/12
                                                        528/196
(Continued)

FOREIGN PATENT DOCUMENTS

EP      0431924 A2    6/1991
JP      05288361 B2   9/2013
WO      2012160344 A1 11/2012

OTHER PUBLICATIONS

Ultem® 1000 PEI, Sterling Plastics Inc., http://sterlingplasticsinc.com/materials/ultem-1000-pei-unfilled-polyetherimide/ (Year: 2012).*
(Continued)

*Primary Examiner* — Peter L Vajda
*Assistant Examiner* — Russell E Sparks
(74) *Attorney, Agent, or Firm* — Cantor Colburn LLP

(57) ABSTRACT

A method comprising: providing a powder composition including at least one ultrafine, spherical thermoplastic polymer powder having a glass transition temperature (Tg) of at least 150 degrees C.; and powder bed fusing the powder composition to form a three-dimensional article.

15 Claims, 2 Drawing Sheets

POWDER A

(51) Int. Cl.
*B29C 64/153* (2017.01)
*B29B 9/12* (2006.01)
*B33Y 10/00* (2015.01)
*C09D 5/03* (2006.01)
*C09D 179/08* (2006.01)
*B29K 105/00* (2006.01)
*C08K 3/36* (2006.01)
*C08J 3/12* (2006.01)
*B29B 9/16* (2006.01)
*B33Y 80/00* (2015.01)

(52) U.S. Cl.
CPC ............... *B33Y 10/00* (2014.12); *B33Y 70/00* (2014.12); *B33Y 80/00* (2014.12); *C08J 3/124* (2013.01); *C09D 5/031* (2013.01); *C09D 179/08* (2013.01); *B29B 2009/125* (2013.01); *B29B 2009/168* (2013.01); *B29K 2105/251* (2013.01); *C08J 2379/08* (2013.01); *C08K 3/36* (2013.01)

(58) Field of Classification Search
USPC .......................................................... 264/497
See application file for complete search history.

(56) References Cited

U.S. PATENT DOCUMENTS

| | | | |
|---|---|---|---|
| 4,690,997 A | 9/1987 | Cella et al. | |
| 4,808,686 A | 2/1989 | Cella et al. | |
| 4,944,817 A | 7/1990 | Bourell et al. | |
| 5,165,994 A * | 11/1992 | Kaler | A61K 9/1272 264/4.1 |
| 5,304,329 A | 4/1994 | Dickens, Jr. et al. | |
| 5,342,919 A | 8/1994 | Dickens, Jr. et al. | |
| 5,382,308 A | 1/1995 | Bourell et al. | |
| 5,385,780 A | 1/1995 | Lee | |
| 5,516,697 A | 5/1996 | Kruzel | |
| 5,527,877 A | 6/1996 | Dickens, Jr. et al. | |
| 5,817,206 A | 10/1998 | McAlea et al. | |
| 6,136,948 A | 10/2000 | Dickens, Jr. et al. | |
| 6,489,372 B1 * | 12/2002 | He | C08G 63/89 521/40 |
| 6,531,086 B1 | 3/2003 | Larsson | |
| 6,589,471 B1 | 7/2003 | Khoshnevis | |
| 8,142,886 B2 * | 3/2012 | Noble | A61F 2/2875 264/497 |
| 9,181,395 B2 * | 11/2015 | Kalayaraman | C08J 3/14 |
| 2002/0033548 A1 | 3/2002 | Brodkin et al. | |
| 2004/0232583 A1 | 11/2004 | Minsheimer et al. | |
| 2007/0232753 A1 | 10/2007 | Monsheimer et al. | |
| 2008/0122141 A1 | 5/2008 | Bedal et al. | |
| 2011/0070442 A1 | 3/2011 | Asano et al. | |
| 2011/0300381 A1 | 12/2011 | Bergerat et al. | |
| 2012/0245239 A1 * | 9/2012 | Kalyanaraman | C08J 3/07 521/54 |
| 2014/0272430 A1 * | 9/2014 | Kalayaraman | C09D 5/027 428/435 |
| 2014/0275365 A1 | 9/2014 | Kalayaraman et al. | |

OTHER PUBLICATIONS

International Preliminary Report for International Application No. PCT/US2015/024452; International Filing Date Apr. 6, 2015; dated Jul. 6, 2015; 5 pages.
International Preliminary Report on Patentability for International Application No. PCT/US2015/024452; International Filing Date Apr. 6, 2015; dated Jun. 28, 2016; 19 pages.
Shi et al., "Effect if the properties of the polymer materials on the quality of selective laser sintering parts"; Proceedings of the Institution of Mechanicai Engineers, Part L: Journal of Materials; Design and Applications; vol. 218, No. 3; 2004; p. 247-252.
Written Opinion of the International Searching Authority for International Application No. PCT/US2015/024452; International Filing Date Apr. 6, 2015; dated Jul. 6, 2015; 5 pages.
Written Opinion of the International Searching Authority for International Application No. PCT/US2015/024452; International Filing Date Apr. 6, 2015; dated Mar. 14, 2016; 5 pages.

* cited by examiner

POWDER A

POWDER B

POWDER BED FUSING THERMOPLASTIC POLYMERS

CROSS REFERENCE TO RELATED APPLICATIONS

This application is a National Stage application of PCT/US2015/024452, filed Apr. 6, 2015, which claims the benefit of U.S. Provisional Application No. 61/976,110, filed Apr. 7, 2014, both of which are incorporated by reference in their entirety herein.

BACKGROUND

Additive Manufacturing (AM) is a production technology that is transforming the way all sorts of things are made. AM makes three-dimensional (3D) solid objects of virtually any shape from a digital model. Generally, this is achieved by creating a digital blueprint of a desired solid object with computer-aided design (CAD) modeling software and then slicing that virtual blueprint into very small digital cross-sections. These cross-sections are formed or deposited in a sequential layering process in an AM machine to create the 3D object. AM has many advantages, including dramatically reducing the time from design to prototyping to commercial product. Running design changes are possible. Multiple parts can be built in a single assembly. No tooling is required. Minimal energy is needed to make these 3D solid objects. It also decreases the amount waste and raw materials. AM also facilitates production of extremely complex geometrical parts. AM also reduces the parts inventory for a business since parts can be quickly made on-demand and on-site.

Several different techniques that use polymers have been developed for AM. These include material extrusion processes such as fused filament fabrication as well as powder bed fusing processes such as laser sintering.

Laser sintering is a process by which a three dimensional article may be formed in a layer-wise fashion by selectively projecting a laser beam having the desired energy onto a bed of resin particles. Prototype or production parts may be efficiently and economically produced by this process, which is often times referred to as selective laser sintering. This process has been described in U.S. Pat. Nos. 4,944,817; 5,516,697 and 5,382,308 to Bourell, et al.; U.S. Pat. Nos. 5,304,329 and 5,342,919 to Dickens, Jr. et al. and U.S. Pat. No. 5,385,780 to Lee.

In the laser sintering process, a high power laser is used to fuse polymer powders of the required material type together into the desired three-dimensional shape. SLS processes require a polymer powder of well-defined shape, size and composition in order to make high quality part. The preferred size of the particles is usually below 100 um (Ref: Proceedings of the Institution of Mechanical Engineers, Part L: Journal of Materials: Design and Applications Jul. 1, 2004 vol. 218 no. 3 247-252) and a narrow distribution of particle sizes is also preferred to get optimum precision and density of the sintered part. In addition, for good stacking of the powder particles, it is important that they have a regular, reproducible shape, like spherical morphology. However, the preparation of such powders from thermoplastic resins on an economic, large scale is not straightforward.

Most of the thermoplastic powders used for powder bed fusion processes such as laser sintering are made by (cryogenic) milling and subsequent sieving. This method has the disadvantage that the distribution in particle size is relatively high and that it is difficult to control the exact size of the powder. Also, fines are generated that cannot be used in the SLS process. Finally, the shape of the powder particles is very irregular.

Recently, Sumika Enviro Science has published a patent (Japanese published patent No. JP05288361B2) that describes a method to make spherical polyamide particles for laser sintering. The spherical polyamide particles are polymerized in an aqueous medium maintaining the shape of the spherical particles. Disadvantage of this method is that it seems not possible to add additives such as colorants, flow agents and the like into the particles. However, this reference does not teach or suggest this process would be useful with any thermoplastic polymers that have high glass transition temperatures (Tg). Also, polyamides have low glass transition temperatures (i.e., below 100 degrees C.)

There is still a need to provide suitable thermoplastic polyetherimide powder that can be used in powder bed fusion processes. The present invention offers a solution to that problem.

BRIEF DESCRIPTION

Some embodiments is directed to a method comprising: providing a powder composition including at least one ultrafine, spherical thermoplastic powder having a glass transition temperature (Tg) of at least 150 degrees C.; and powder bed fusing the powder composition to form a three-dimensional article.

Another embodiment is directed to a method comprising: providing a powder composition including at least one ultrafine, spherical thermoplastic powder having a glass transition temperature (Tg) of at least 150 degrees C. wherein the thermoplastic powder is chosen from polyetherimides, polysulfones, and polyarylsulfones and combinations thereof; and powder bed fusing the powder composition to form a three-dimensional article.

Still another embodiment is directed to a method comprising providing a powder composition including at least one ultrafine, high Tg, spherical polyetherimide powder; and powder bed fusing the powder composition to form a three-dimensional article.

Another embodiment is directed to the method of manufacturing a three dimensional article may comprise the steps of: (1) depositing a quantity of a powder composition including at least one ultrafine, high Tg, spherical thermoplastic powder on a support surface; (2) leveling the composition to form a smooth layer on the support surface; (3) then directing an energy beam over a predetermined target area on the support surface causing the composition to form an integral layer; and (d) repeating steps (1) to (3) to form additional layers that are integrally bonded to adjacent layers to form a three-dimensional article, wherein the thermoplastic composition includes at least one ultrafine, high Tg, spherical thermoplastic powder. The energy beam may be a laser.

And still another embodiment is directed to the use of powders made with the emulsion process as described in U.S. patent application Ser. No. 13/841,802, filed on 15 Mar. 2013, in powder bed fusing processes.

Still another embodiment is directed to three dimensional articles of manufacture made be the powder bed fusing processes as described herein The above described and other features are exemplified by the following figures and detailed description.

BRIEF DESCRIPTION OF THE DRAWINGS

Referring to the Figures, which are exemplary embodiments.

DETAILED DESCRIPTION

Figure 1A:
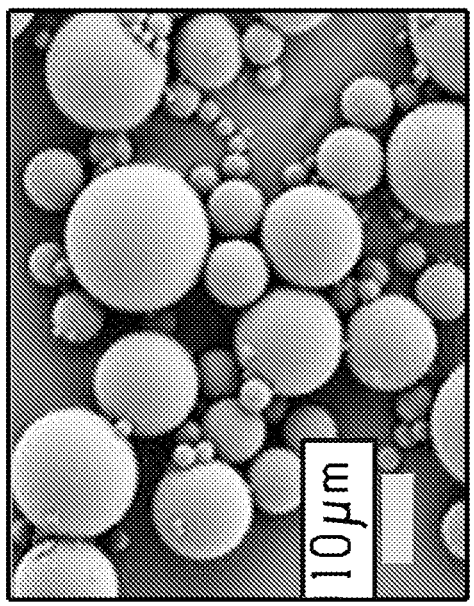
FIG. 1A is a micrographs showing the particle size morphology of a powder manufactured by jet milling.

The present process has several advantages. This method employs spherical particles of well-defined particle size in the range that is optimum for powder bed fusing processes such as laser sintering and with a narrow size distribution. Also, with this process, the powder compositions that contain additives like stabilizers, colorants and flow agents, or even specific additives that can help in the laser sintering process (e.g. specific absorbers for laser wavelength, curable resin to post crosslink, and the like.). Another advantage of the good particle size control with this method is that it gives the advantage of mixing 2 or more powders with different particle sizes. This may lead to better layer formation due to improved particle stacking, similar to the use of latexes with different particle sizes in waterborne emulsion paints.

The phrase "thermoplastic powder having a glass transition temperature (Tg) of at least 150 degrees C." as used herein includes at least one thermoplastic polymer powder that have a glass transition temperature of at least 150 degrees C. Examples of these powders can include polyetherimides, polysulfones, and polyarylsulfones and combinations thereof. Suitable polyarylsulfones include polyphenylsulfones. Specific embodiments include ULTEM polyetherimide polymers (including such grades such as 1000 and 1040), SILTEM poly(siloxane-etherimide) polymers (including such grades such as STM1700, STM1500 as well as XH6050).

The term "ultrafine" as used herein means thermoplastic powdered particles that a mean particle size of about 10 to about 100 microns wherein the amount of powder particles less than 10 microns is less than 2 percent by volume. In some embodiments, the powder can be monomodal and have a mean particle of about 10 to about 100 microns. In another embodiment, at least two powder compositions may employed wherein each powder composition has a different mean particle size from about 10 to about 100 microns, thereby forming a polymodal powder composition. The powder may also have a bulk density of greater than 0.5 grams per cubic centimeter (g/cc).

The term "spherical" as used herein means the thermoplastic powder particles are substantially spherical in shape. These spherical particles can be made by the emulsion process as described in U.S. patent application, Ser. No. 13/841,802 filed on 15 Mar. 2013

The term "polyetherimide" is used herein to mean a compound comprising more than 1, for example 10 to 1000, or 10 to 500, structural units of formula (1)

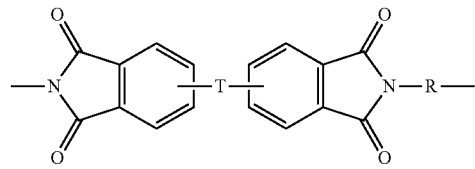

wherein each R is the same or different, and is a substituted or unsubstituted divalent organic group, such as a $C_{6\text{-}20}$ aromatic hydrocarbon group or a halogenated derivative thereof, a straight or branched chain $C_{2\text{-}20}$ alkylene group or a halogenated derivative thereof, a $C_{3\text{-}8}$ cycloalkylene group or halogenated derivative thereof, in particular a divalent group of formula (2)

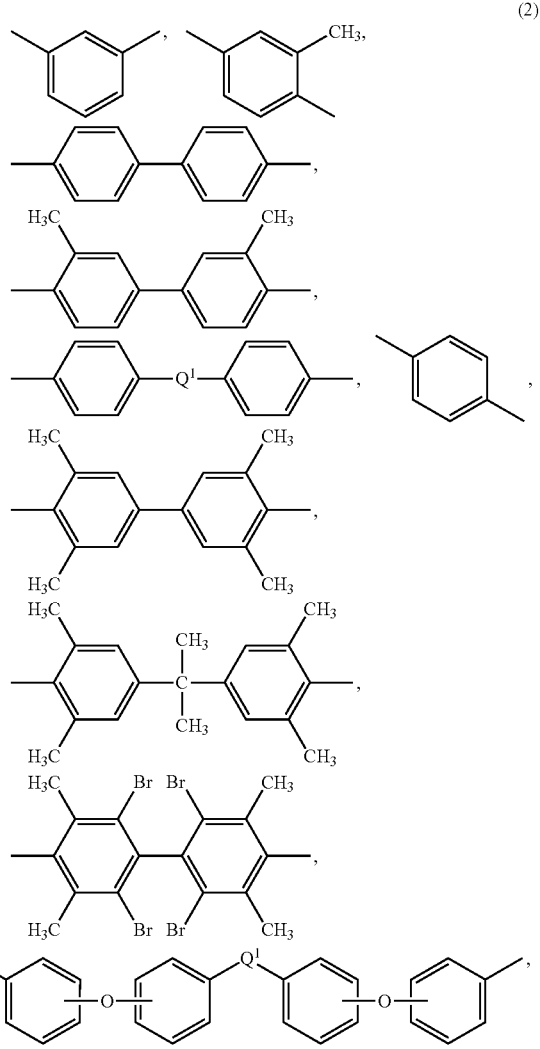

wherein $Q^1$ is —O—, —S—, —C(O)—, —SO$_2$—, —SO—, —$C_yH_{2y}$— wherein y is an integer from 1 to 5 or a halogenated derivative thereof (which includes perfluoroalkylene groups), or —($C_6H_{10}$)$_z$— wherein z is an integer from 1 to 4. In an embodiment R is m-phenylene, p-phenylene, or a diaryl sulfone.

Further in formula (1), T is —O— or a group of the formula —O—Z—O— wherein the divalent bonds of the —O— or the —O—Z—O— group are in the 3,3', 3,4', 4,3', or the 4,4' positions. The group Z in —O—Z—O— of formula (1) is also a substituted or unsubstituted divalent organic group, and can be an aromatic $C_{6-24}$ monocyclic or polycyclic moiety optionally substituted with 1 to 6 $C_{1-8}$ alkyl groups, 1 to 8 halogen atoms, or a combination thereof, provided that the valence of Z is not exceeded. Exemplary groups Z include groups derived from a dihydroxy compound of formula (3)

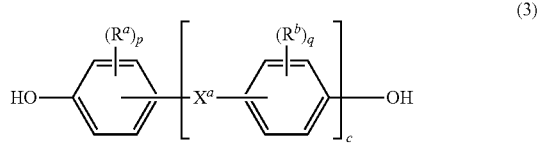

(3)

wherein $R^a$ and $R^b$ can be the same or different and are a halogen atom or a monovalent $C_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (3a)

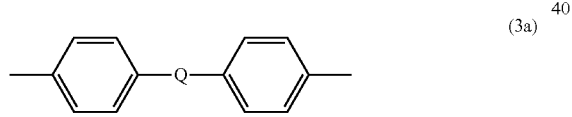

(3a)

wherein Q is —O—, —S—, —C(O)—, —SO$_2$—, —SO—, or —C$_y$H$_{2y}$— wherein y is an integer from 1 to 5 or a halogenated derivative thereof (including a perfluoroalkylene group). In a specific embodiment Z is a derived from bisphenol A, such that Q in formula (3a) is 2,2-isopropylidene.

In an embodiment in formula (1), R is m-phenylene or p-phenylene and T is —O—Z—O— wherein Z is a divalent group of formula (3a). Alternatively, R is m-phenylene or p-phenylene and T is —O—Z—O wherein Z is a divalent group of formula (3a) and Q is 2,2-isopropylidene.

In some embodiments, the polyetherimide can be a copolymer, for example, a polyetherimide sulfone copolymer comprising structural units of formula (1) wherein at least 50 mole % of the R groups are of formula (2) wherein $Q^1$ is —SO$_2$— and the remaining R groups are independently p-phenylene or m-phenylene or a combination comprising at least one of the foregoing; and Z is 2,2'-(4-phenylene) isopropylidene. Alternatively, the polyetherimide optionally comprises additional structural imide units, for example imide units of formula (4)

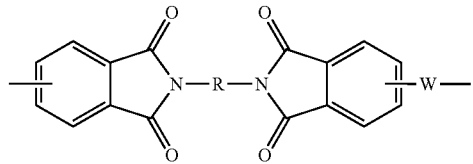

(4)

wherein R is as described in formula (1) and W is a linker of the formulas

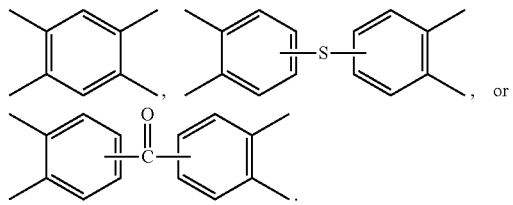

, or

These additional structural imide units can be present in amounts from 0 to 10 mole % of the total number of units, specifically 0 to 5 mole %, more specifically 0 to 2 mole %. In an embodiment no additional imide units are present in the polyetherimide.

The polyetherimide can be prepared by any of the methods well known to those skilled in the art, including the reaction of an aromatic bis(ether anhydride) of formula (5)

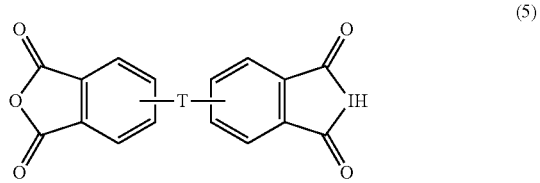

(5)

with an organic diamine of formula (6)

$H_2N—R—NH_2$ (6)

wherein T and R are defined as described above. Copolymers of the polyetherimides can be manufactured using a combination of an aromatic bis(ether anhydride) of formula (5) and a different bis(anhydride), for example a bis(anhydride) wherein T does not contain an ether functionality, for example T is a sulfone.

Illustrative examples of bis(anhydride)s include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)

benzophenone dianhydride; and, 4-(2,3-dicarboxyphenoxy)-4'-(3,4-dicarboxyphenoxy)diphenyl sulfone dianhydride, as well as various combinations thereof.

Examples of organic diamines include ethylenediamine, propylenediamine, trimethylenediamine, diethylenetriamine, triethylene tetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis (4-aminophenyl) propane, 2,4-bis(p-amino-t-butyl) toluene, bis(p-amino-t-butyphenyl) ether, bis(p-methyl-o-aminophenyl) benzene, bis(p-methyl-o-aminopentyl) benzene, 1, 3-diamino-4-isopropylbenzene, bis(4-aminophenyl) sulfide, bis-(4-aminophenyl) sulfone, and bis(4-aminophenyl) ether. Combinations of these compounds can also be used. In some embodiments the organic diamine is m-phenylenediamine, p-phenylenediamine, sulfonyl dianiline, or a combination comprising one or more of the foregoing.

The polyetherimides can have a melt index of 0.1 to 10 grams per minute (g/min), as measured by American Society for Testing Materials (ASTM) D1238 at 340 to 370° C., using a 6.7 kilogram (kg) weight. In some embodiments, the polyetherimide polymer has a weight average molecular weight (Mw) of 1,000 to 150,000 grams/mole (Dalton), as measured by gel permeation chromatography, using polystyrene standards. In some embodiments the polyetherimide has an Mw of 10,000 to 80,000 Daltons. Such polyetherimide polymers typically have an intrinsic viscosity greater than 0.2 deciliters per gram (dl/g), or, more specifically, 0.35 to 0.7 dl/g as measured in m-cresol at 25° C.

The thermoplastic "polyetherimide" composition as used in the present specification and claims can also comprise a poly(siloxane-etherimide) copolymer comprising polyetherimide units of formula (1) and siloxane blocks of formula (7).

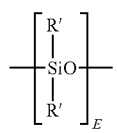
(7)

wherein each R' is independently a $C_{1-13}$ monovalent hydrocarbyl group. For example, each R' can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination comprising at least one of the foregoing. In an embodiment no halogens are present. Combinations of the foregoing R groups can be used in the same copolymer. In an embodiment, the polysiloxane blocks comprises R' groups that have minimal hydrocarbon content. In a specific embodiment, an R' group with a minimal hydrocarbon content is a methyl group.

The poly (siloxane-etherimide)s can be formed by polymerization of an aromatic bisanhydride (4) and a diamine component comprising an organic diamine (6) as described above or mixture of diamines, and a polysiloxane diamine of formula (7)

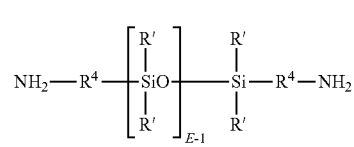
(8)

wherein R' and E are as described in formula (7), and $R^4$ is each independently a $C_2$-$C_{20}$ hydrocarbon, in particular a $C_2$-$C_{20}$ arylene, alkylene, or arylenealkylene group. In an embodiment $R^4$ is a $C_2$-$C_{20}$ alkyl group, specifically a $C_2$-$C_{20}$ alkyl group such as propylene, and E has an average value of 5 to 100, 5 to 75, 5 to 60, 5 to 15, or 15 to 40. Procedures for making the polysiloxane diamines of formula (8) are well known in the art.

In some poly(siloxane-etherimide)s the diamine component can contain 10 to 90 mole percent (mol %), or 20 to 50 mol %, or 25 to 40 mol % of polysiloxane diamine (8) and 10 to 90 mol %, or 50 to 80 mol %, or 60 to 75 mol % of diamine (6), for example as described in U.S. Pat. No. 4,404,350. The diamine components can be physically mixed prior to reaction with the bisanhydride(s), thus forming a substantially random copolymer. Alternatively, block or alternating copolymers can be formed by selective reaction of (6) and (8) with aromatic bis(ether anhydrides (5), to make polyimide blocks that are subsequently reacted together. Thus, the poly(siloxane-imide) copolymer can be a block, random, or graft copolymer.

Examples of specific poly(siloxane-etherimide) are described in U.S. Pat. Nos. 4,404,350, 4,808,686 and 4,690,997. In an embodiment, the poly(siloxane-etherimide) has units of formula (9)

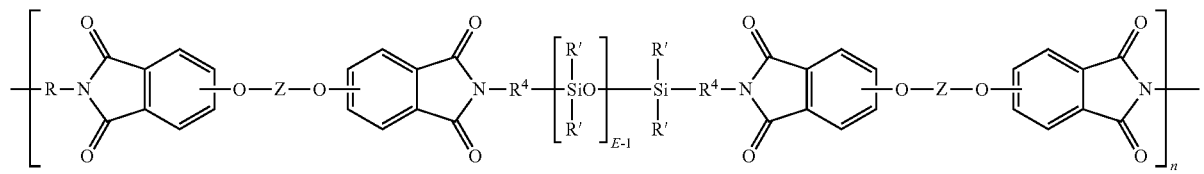
(9)

wherein R' and E of the siloxane are as in formula (5), the R and Z of the imide are as in formula (1), $R^4$ is the same as $R^4$ as in formula (8), and n is an integer from 5 to 100. In a specific embodiment, the R of the etherimide is a phenylene, Z is a residue of bisphenol A, $R^4$ is n-propylene, E is 2 to 50, 5, to 30, or 10 to 40, n is 5 to 100, and each R' of the siloxane is methyl.

The relative amount of polysiloxane units and etherimide units in the poly(siloxane-etherimide) depends on the desired properties, and are selected using the guidelines provided herein. In particular, as mentioned above, the block or graft poly(siloxane-etherimide) copolymer is selected to have a certain average value of E, and is selected and used in amount effective to provide the desired wt % of polysiloxane units in the composition. In an embodiment the poly(siloxane-etherimide) comprises 10 to 50 wt %, 10 to 40 wt %, or 20 to 35 wt % polysiloxane units, based on the total weight of the poly(siloxane-etherimide).

The term "alkyl" includes branched or straight chain, unsaturated aliphatic $C_{1-30}$ hydrocarbon groups e.g., methyl, ethyl, n-propyl, i-propyl, n-butyl, s-butyl, t-butyl, n-pentyl, s-pentyl, n- and s-hexyl, n- and s-heptyl, and, n- and s-octyl. "Alkenyl" means a straight or branched chain, monovalent hydrocarbon group having at least one carbon-carbon double bond (e.g., ethenyl (—HC═CH$_2$)). "Alkoxy" means an alkyl group that is linked via an oxygen (i.e., alkyl-O—), for example methoxy, ethoxy, and sec-butyloxy groups.

"Alkylene" means a straight or branched chain, saturated, divalent aliphatic hydrocarbon group (e.g., methylene (—CH$_2$—) or, propylene (—(CH$_2$)$_3$—)).

"Cycloalkylene" means a divalent cyclic alkylene group, —$C_nH_{2n-x}$, wherein x represents the number of hydrogens replaced by cyclization(s). "Cycloalkenyl" means a monovalent group having one or more rings and one or more carbon-carbon double bond in the ring, wherein all ring members are carbon (e.g., cyclopentyl and cyclohexyl).

The term "aryl" means an aromatic hydrocarbon group containing the specified number of carbon atoms, such as to phenyl, tropone, indanyl, or naphthyl. The prefix "hetero" means that the compound or group includes at least one ring member that is a heteroatom (e.g., 1, 2, or 3 heteroatom(s)), wherein the heteroatom(s) is each independently N, O, S, or P.

"Substituted" means that the compound or group is substituted with at least one (e.g., 1, 2, 3, or 4) substituents independently selected from, a $C_{1-9}$ alkoxy, a $C_{1-9}$ haloalkoxy, a nitro (—NO$_2$), a cyano (—CN), a $C_{1-6}$ alkyl sulfonyl (—S(═O)$_2$-alkyl), a $C_{6-12}$ aryl sulfonyl (—S(═O)$_2$-aryl) a thiol (—SH), a thiocyano (—SCN), a tosyl (CH$_3$C$_6$H$_4$SO$_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded.

The at least one ultrafine, high Tg, spherical polyetherimide powder used in the present processes can be made by the methods disclosed in U.S. patent application Ser. No. 13/841,802 filed on Mar. 15, 2013, which is incorporated herein by reference in its entirety.

In some embodiments, the at least one ultrafine, high Tg, spherical thermoplastic powder such as polyetherimide powder is made by a process comprising (a) dissolving high Tg thermoplastic material such as polyetherimide polymer in an organic solvent capable of dissolving the thermoplastic material to form a solution; (b) emulsifying the solution by combining the solution with water and a surfactant to form an emulsion; (c) transferring the emulsion into a receiving water containing a surfactant to remove the organic solvent and form a slurry; and (d) recovering thermoplastic particles of less than 75 micron diameter. This process may further include heating the emulsion up to or below the boiling point of the emulsion before transferring the emulsion into the receiving water. Alternatively, this process may include heating the emulsion above the boiling point of the emulsion before transferring the emulsion into the receiving water. The solvent may be a member selected from the group of methylene chloride, chloroform, and combinations thereof. The surfactant may be an anionic surfactant including sodium dodecyl benzene sulfonate (SDBS), sodium lauryl sulfate, and combinations thereof. This process may further comprise filtering the slurry to form a wet cake. And, this process may further comprise drying the wet cake under heat and vacuum.

In other embodiment, the at least one ultrafine, high Tg, spherical thermoplastic powder such as polyetherimide polymer powder is made by the steps of: (a) dissolving a thermoplastic material such as polyetherimide polymer in a solvent to form a solution, wherein the thermoplastic material is soluble in the solvent, the solvent has a boiling point that is less than 100° C. and the solvent is immiscible with water; (b) emulsifying the solution by combining the solution with de-ionized water and a surfactant under agitation conditions sufficient to form an emulsion; (c) transferring the emulsion into a de-ionized receiving water, the receiving water also containing a surfactant and removing the solvent and form a slurry; (d) pre-filtering the slurry to remove any macro particles or contaminates; (e) filtering the slurry to form a wet cake; (f) filtering the slurry to form a wet cake; (g) drying the washed wet cake under heat and vacuum; and (h) recovering particles of thermoplastic material such as polyetherimide (PEI) of less than 75 micron diameter.

The powder composition comprises between 50 to 100 weight percent of the at least one ultrafine, high Tg, spherical thermoplastic polymer powder such as polyetherimide powder, based on the weight of polymeric materials in the powder. Besides the spherical polyetherimide powder, the powder composition can contain a colorant or a process aid.

In some embodiments, the powder composition may optionally contain a flow agent. In particular, a thermoplastic composition of the present invention contains 0%, preferably 0.05%, to about 5%, and more preferably about 0.075% to about 1%, by weight of a particulate flow agent. Particularly, the powder composition contains about 0.1% to about 0.25%, by weight, of the flow agent.

This optional flow agent included in the powder composition is a particulate inorganic material having a median particle size of 10 microns or less, and is chosen from the group consisting of a hydrated silica, amorphous alumina, a glassy silica, a glassy phosphate, a glassy borate, a glassy oxide, titania, talc, mica, a fumed silica, kaolin, attapulgite, calcium silicate, alumina, and magnesium silicate. The flow agent preferably is present in an amount sufficient to allow the polyetherimide to flow and level on the build surface of the laser sintering device. One useful flow agent is a fumed silica.

A powder composition also can contain other optional ingredients. These optional ingredients are particulate materials and include organic and inorganic materials, such as fillers and coloring agents. An optional ingredient is present in a sufficient amount to perform its intended function, without adversely affecting the thermoplastic composition or an article prepared therefrom. Optional ingredients have a particle size in the range of the particle sizes of the polyetherimide and/or optional flow agent. Each optional ingredient is milled, if necessary, to the desired median particle size and particle size distribution.

Each individual optional ingredient, if present at all, typically is present in the powder composition in an amount of about 0.1% to about 30%, by weight, of the composition. The total amount of optional ingredients in the powder composition ranges from 0% up to about 30%, by weight.

It is not necessary for each optional ingredient to melt during the laser sintering process. However, each optional ingredient must be compatible with the polyetherimide in order to provide a strong and durable article of manufacture. The optional ingredient, therefore, can be inorganic, filler that imparts additional strength to the article of manufacture.

Another optional ingredient is a coloring agent, for example a pigment or a dye, like carbon black, to impart a desired color to the article of manufacture. The coloring agent is not limited, as long as the coloring agent does not adversely affect the composition or an article prepared therefrom, and is sufficiently stable to retain its color under conditions of the laser sintering process and during exposure to the laser.

Still other additional optional ingredients may also include, for example, toners, extenders, fillers, colorants (e.g., pigments and dyes), lubricants, anticorrosion agents, thixotropic agents, dispersing agents, antioxidants, adhesion promoters, light stabilizers, organic solvents, surfactants, flame retardants, and mixtures thereof.

Still another optional ingredient also can be a second polymer that modifies the properties of the polyetherimide.

The spherical polyetherimide powder used herein may have certain characteristics. It may have a glass transition temperature of more than 150° C. and less than 350° C., more particular, it may have a glass transition temperature of more than 200° C. and less than 300° C. In some embodiments, the commercially available ULTEM polyether imide has a tg of 215 degrees C. It may have comprises at least 5 weight percent of one or more amorphous polyetherimide powder. It may have has a weight average molecular weight of between 1,000 and 150,000 Daltons. Each powder may be monomodal and have a mean particle of about 10 to about 75 microns. The powder may have a bulk density of greater than 0.5 grams per cubic centimeter (g/cc). In another embodiment, at least two powder compositions may employed wherein each powder composition has a different mean particle size, thereby forming a polymodal powder composition. In some embodiments, the method of manufacturing a three dimensional article may comprise the steps of: (1) depositing a quantity of a powder composition including at least one ultrafine, high Tg, spherical polyetherimide powder on a support surface; (2) leveling the composition to form a smooth layer on the support surface; (3) then directing an energy beam over a predetermined target area on the support surface causing the composition to form an integral layer; and (d) repeating steps (1) to (3) to form additional layers that are integrally bonded to adjacent layers to form a three-dimensional article, wherein the thermoplastic composition includes at least one ultrafine, high Tg, spherical polyetherimide powder. The energy beam may be a laser.

The term "powder bed fusing" is used herein to mean all laser sintering and all selective laser sintering processes as well as other powder bed fusion processes. For example, sintering of the powder composition may be accomplished via application of electromagnetic radiation other than that produced by a laser, with the selectivity of the sintering achieved, for example, through selective application of inhibitors, absorbers, susceptors, or the electromagnetic radiation (e.g., through use of masks or directed laser beams). Any other suitable source of electromagnetic radiation may be used, including, for example, infrared radiation sources, microwave generators, lasers, radiative heaters, lamps, or a combination thereof. In some embodiments, selective mask sintering ("SMS") techniques may be used to produce three-dimensional articles of the invention. For further discussion of SMS processes, see for example U.S. Pat. No. 6,531,086 which describes an SMS machine in which a shielding mask is used to selectively block infrared radiation, resulting in the selective irradiation of a portion of a powder layer. If using an SMS process to produce articles from powder compositions of the invention, it may be desirable to include one or more materials in the powder composition that enhance the infrared absorption properties of the powder composition. For example, the powder composition may include one or more heat absorbers and/or dark-colored materials (e.g., carbon black, carbon nanotubes, or carbon fibers).

The present invention also includes all three dimensional products made by powder bed fusing these powder compositions. After a layer-by-layer manufacture of an article of manufacture, the article may exhibit excellent resolution, durability, and strength. These articles of manufacture may have a wide variety of uses, including as prototypes and as end products as well as molds for end products.

In particular, powder bed fused (e.g., laser sintered) articles may be produced from the powder compositions using any suitable powder bed fusing processes including laser sintering processes. These articles can include a plurality of overlying and adherent sintered layers that include a polymeric matrix which, in some embodiments, have reinforcement particles dispersed throughout the polymeric matrix. Laser sintering processes are sufficiently well known, and are based on the selective sintering of polymer particles, where layers of polymer particles are briefly exposed to laser light and the polymer particles exposed to the laser light are thus bonded to one another. Successive sintering of layers of polymer particles produces three-dimensional objects. Details concerning the selective laser sintering process are found, by way of example, in the specifications U.S. Pat. No. 6,136,948 and WO 96/06881. However, the powder described herein may also be used in other rapid prototyping or rapid manufacturing processing of the prior art, in particular in those described above. For example, the inventive powder may in particular be used for producing moldings from powders via the SLS (selective laser sintering) process, as described in U.S. Pat. No. 6,136, 948 or WO 96/06881, via the SIB process (selective inhibition of bonding of powder), as described in WO 01/38061, via 3D printing, as described in EP 0 431 924, or via a microwave process, as described in DE 103 11 438. The specifications cited, and in particular the processes described therein, are expressly incorporated into the disclosure content of the present description of the invention by way of reference.

The sintered layers of laser sintered articles of the present invention may be of any thickness suitable for laser sintered processing. The plurality of sintered layers may be each, on average, preferably at least about 50 microns thick, more preferably at least about 80 microns thick, and even more preferably at least about 100 microns thick. In a preferred embodiment, the plurality of sintered layers are each, on average, preferably less than about 200 microns thick, more preferably less than about 150 microns thick, and even more preferably less than about 120 microns thick. Three-dimensional articles produced from powder compositions of the invention using a layer-by-layer sintering other than laser sintering may have layer thicknesses that are the same or different from those described above.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

Examples

Figure 1B:
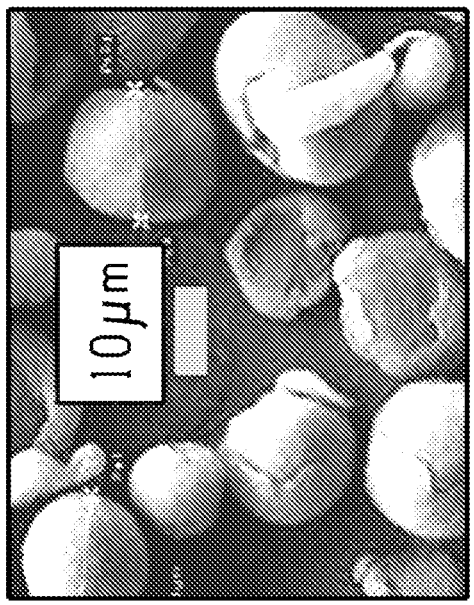
FIG. 1B is a micrograph showing the particle size morphology of a powder manufactured by an emulsion process.

To evaluate the advantages of the spherical morphology in the SLS process a comparative study was conducted. Two powders with comparable mean particle size were manufactured. Powder A was manufactured through jet milling while powder B was manufactured via the emulsion process described herein. The difference in particle surface morphology is apparent from the SEM images shown in FIG. 1.

Powder A has a rough, cracked surface and potato-like morphology while the powder B consists of dense spheres. The mean particle size for both powder A and B where between 10-15 micron. The particle size distribution for powder A was much narrower than that of powder B as can be seen from the tabulated data below. Powder B contains a larger percentage of submicron particles.

TABLE 1

| PSD | D10 [micron] | D50 [micron] | D90 [micron] |
|---|---|---|---|
| Powder A | 5.98 | 10.45 | 17.01 |
| Powder B | 4.07 | 14.66 | 45.97 |

Several methods have been developed in the past to quantitatively characterize powder flow, including Angle of Repose, Hausner Ratio, bulk/tap density, and the like. However a reliable means of correlating these powder properties and actual powder handling within the SLS process is still under development. Therefore a qualitative scale from 1-4 is used to distinguish between the performance of the two powders, as given in Table 2:

TABLE 2

| Ranking# | Description |
|---|---|
| 1 | Poor powder flow: powder tends to stick together, tumbles in large pieces or needs to be dragged to the build platform. Impossible to create a smooth powder bed. |
| 2 | Usable powder flow: powder still tends to stick and amalgamate and is difficult to move to the build platform, but with some effort a usable power bed can be created. |
| 3 | Sufficient powder flow: powder tumbles freely and tends not to amalgamate. and can transported to create a smooth surface on the build platform |
| 4 | Good powder flow: powder flows freely and can easily be transported to the build platform to form a smooth surface |

Figure 2A:
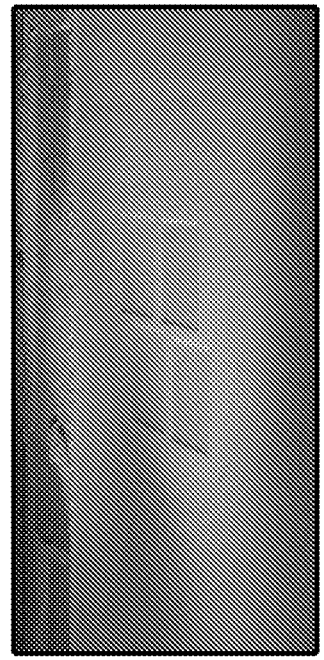
FIG. 2A is a micrographs showing the build platform surfaces using the two different SLS powders shown in FIG. 1A.

Ultrafine powders typically exhibit poor powder flow, even with the addition of large quantities flow promotors. Powder A exhibited poor powder flow behavior as indicated in Table 3. Even with the addition of 2% (by weight) of fumed silica flow promotor, it was impossible to create a smooth powder bed from which 3D parts could be manufactured. A sample of the powder bed is shown in FIG. 2(a).

TABLE 3

Powder flow behavior of polyetherimide made from jet milling process versus emulsion based process. The flow behavior was quantified from poor (ranked as 1) to good (ranked as 4).

| Sample | Description | Additive | Powder flow ranking |
|---|---|---|---|
| A | Jet milled powder | None | 1 |
| A | Jet milled powder | 2% fumed silica | 1 |
| B | Powder from emulsion process | None | 2 |
| B | Powder from emulsion process | 0.1% fumed silica | 4 |

Figure 2B:
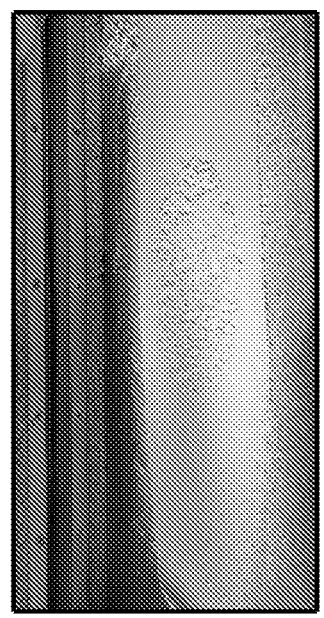
FIG. 2B is a micrograph showing the build platform surface using the powder shown in FIG. 1B.

The advantages of the spherical powder, powder B, is clearly apparent when processing the powders within an SLS machine. Even with a significant amount of submicron particles, adding 0.1% (by weight) of fumed silica flow promotor, powder B exhibits good powder flow behavior as shown in Table 3. A smooth surface on the build platform is easily created as shown in FIG. 2(b).

Figure 3:
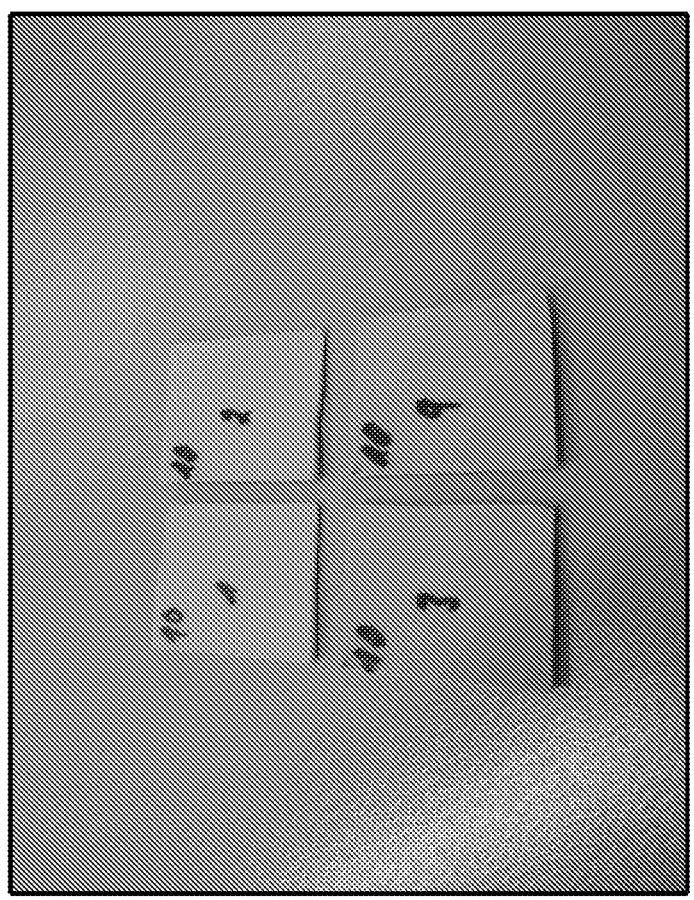
FIG. 3 is a microphotograph showing a 3D laser sintered part manufactured with powder B shown in FIGS. 1 and 2.

Proof of concept was demonstrated with powder B by manufacturing four square parts. Each part consisted of twenty subsequently sintered powder layers. A sample of the manufactured parts are shown in FIG. 3. The parts made by the SLS process using powder B, showed good mechanical integrity whereas it was not possible to manufacture a part using powder A, as summarized in Table 4.

TABLE X4

| Sample | Additive | SLS process can be used to make parts with integrity |
|---|---|---|
| Powder A | 2% fumed silica | No |
| Powder B | 0.1% fumed silica | Yes |

The present invention is further illustrated by the following Embodiments.

Embodiment 1

A method comprising: providing a powder composition including at least one ultrafine, spherical thermoplastic polymer powder having a glass transition temperature (Tg) of at least 150 degrees C.; and powder bed fusing the powder composition to form a three-dimensional article.

Embodiment 2

The method of Embodiment 1, wherein the powder composition comprises between 50 to 100 weight percent of the at least one ultrafine, high Tg, spherical thermoplastic polymer powder, based on the weight of polymeric materials in the powder.

Embodiment 3

The method of any of Embodiments 1-2, wherein the spherical thermoplastic polymer powder has a glass transition temperature of more than 150° C. and less than 350° C.

Embodiment 4

The method of any of Embodiments 1-3, wherein the spherical thermoplastic polymer powder has a glass transition temperature of more than 200° C. and less than 300° C.

Embodiment 5

The method of any of Embodiments 1-4, wherein the thermoplastic polymer powder has a weight average molecular weight of between 1,000 and 150,000 Daltons.

Embodiment 6

The method of any of Embodiments 1-5, wherein each ultrafine, high Tg, spherical thermoplastic polymer powder is monomodal and has a mean particle of about 10 to about 75 microns and the amount of powder particles smaller than 10 microns is less than 2 percent by volume.

Embodiment 7

The method of any of Embodiments 1-6, further comprising adding a flow agent or to the powder composition.

Embodiment 8

The method of Embodiment 7, wherein the flow agent chosen from the group consisting of a hydrated silica, amorphous alumina, a glassy silica, a glassy phosphate, a glassy borate, a glassy oxide, titania, talc, mica, a fumed silica, kaolin, attapulgite, calcium silicate, alumina, and magnesium silicate and combinations thereof.

Embodiment 9

The method of any of Embodiments 7-8, wherein the amount of flow agent is from about 0.05% to about 5% of the powder composition.

Embodiment 10

The method of any of Embodiments 1-9, wherein the polyetherimide powder has a bulk density of greater than 0.5 grams per cubic centimeter.

Embodiment 11

The method of any of Embodiments 1-10, wherein at least two powder compositions are employed and each powder composition has a different mean particle size, thereby forming a polymodal powder composition.

Embodiment 12

A method comprising: providing a powder composition including at least one ultrafine, spherical thermoplastic polymer powder having a glass transition temperature (Tg) of at least 150 degrees C. wherein the thermoplastic polymer powder is chosen from polyetherimides, polysulfones, and polyarylsulfones and combinations thereof; and powder bed fusing the powder composition to form a three-dimensional article.

Embodiment 13

The method of Embodiment 12, wherein the powder composition comprises between 50 to 100 weight percent of the at least one ultrafine, high Tg, spherical thermoplastic polymer powder, based on the weight of polymeric materials in the powder.

Embodiment 14

The method of any of Embodiments 12-13, wherein the spherical thermoplastic polymer powder has a glass transition temperature of more than 150° C. and less than 350° C.

Embodiment 15

The method of any of Embodiments 12-14, wherein the spherical thermoplastic polymer powder has a glass transition temperature of more than 200° C. and less than 300° C.

Embodiment 16

The method of any of Embodiments 12-15, wherein the thermoplastic polymer powder has a weight average molecular weight of between 1,000 and 150,000 Daltons.

Embodiment 17

The method of any of Embodiments 12-16, wherein each ultrafine, high Tg, spherical thermoplastic polymer powder is monomodal and has a mean particle of about 10 to about 75 microns and the amount of powder particles smaller than 10 microns is less than 2 percent by volume.

Embodiment 18

The method of any of Embodiments 12-17, further comprising adding a flow agent or to the powder composition.

Embodiment 19

The method of Embodiment 18, wherein the flow agent chosen from the group consisting of a hydrated silica, amorphous alumina, a glassy silica, a glassy phosphate, a glassy borate, a glassy oxide, titania, talc, mica, a fumed silica, kaolin, attapulgite, calcium silicate, alumina, and magnesium silicate and combinations thereof.

Embodiment 20

The method of any of Embodiments 18-19, wherein the amount of flow agent is from about 0.05% to about 5% of the powder composition.

Embodiment 21

The method of any of Embodiments 1-20, wherein the polyetherimide powder has a bulk density of greater than 0.5 grams per cubic centimeter.

Embodiment 22

The method of any of Embodiments 1-21, wherein at least two powder compositions are employed and each powder composition has a different mean particle size, thereby forming a polymodal powder composition.

Embodiment 23

A method comprising: providing a powder composition including at least one ultrafine, high Tg, spherical polyetherimide powder; and powder bed fusing the powder composition to form a three-dimensional article.

Embodiment 24

The method of Embodiment 23, wherein the powder composition comprises between 50 to 100 weight percent of the at least one ultrafine, high Tg, spherical polyetherimide powder, based on the weight of polymeric materials in the powder.

Embodiment 25

The method of any of Embodiments 23-24, wherein the spherical polyetherimide powder has a glass transition temperature of more than 150° C. and less than 350° C.

Embodiment 26

The method of any of Embodiments 23-25, wherein the spherical polyetherimide powder has a glass transition temperature of more than 200° C. and less than 300° C.

Embodiment 27

The method of any of Embodiments 23-26, wherein the powder composition comprises at least 5 weight percent of one or more amorphous polyetherimide powder.

Embodiment 28

The method of any of Embodiments 23-27, wherein the polyetherimide powder has a weight average molecular weight of between 1,000 and 150,000 Daltons.

Embodiment 29

The method of any of Embodiments 23-24, wherein each ultrafine, high Tg, spherical polyetherimide powder is monomodal and has a mean particle of about 10 to about 75 microns.

Embodiment 30

The method of any of Embodiments 23-29, wherein at least one ultrafine, high Tg, spherical polyetherimide powder is made by a process comprising (a) dissolving polyetherimide in an organic solvent capable of dissolving the polyetherimide to form a solution; (b) emulsifying the solution by combining the solution with water and a surfactant to form an emulsion; (c) transferring the emulsion into a receiving water containing a surfactant to remove the organic solvent and form a slurry; and (d) recovering polyetherimide particles of less than 75 micron diameter.

Embodiment 31

The method of Embodiment 30, further comprising heating the emulsion up to or below the boiling point of the emulsion before transferring the emulsion into the receiving water.

Embodiment 32

The method of any of Embodiments 30-31, further comprising heating the emulsion above the boiling point of the emulsion before transferring the emulsion into the receiving water.

Embodiment 33

The method of any of Embodiments 30-32, wherein the solvent is a member selected from the group of methylene chloride, chloroform, and combinations thereof.

Embodiment 34

The method of any of Embodiments 30-33, wherein the surfactant is anionic, cationic or non-ionic surfactant or combinations thereof.

Embodiment 35

The method of any of Embodiments 30-34, wherein the surfactant is a surfactant selected from the group of sodium dodecyl benzene sulfonate (SDBS), sodium lauryl sulfate, and combinations thereof.

Embodiment 36

The method of any of Embodiments 30-35, further comprising filtering the slurry to form a wet cake.

Embodiment 37

The method of any of Embodiments 30-36, further comprising drying the wet cake under heat and vacuum.

Embodiment 38

The method of any of Embodiments 23-37, further comprising adding a flow agent or to the powder composition.

Embodiment 39

The method of Embodiment 38, wherein the flow agent chosen from the group consisting of a hydrated silica, amorphous alumina, a glassy silica, a glassy phosphate, a glassy borate, a glassy oxide, titania, talc, mica, a fumed silica, kaolin, attapulgite, calcium silicate, alumina, and magnesium silicate and combinations thereof.

Embodiment 40

The method of any of Embodiments 38-39, wherein the amount of flow agent is from about 0.05% to about 5% of the powder composition.

Embodiment 41

The method of any of Embodiments 23-40, wherein the polyetherimide powder has a bulk density of greater than 0.5 grams per cubic centimeter.

Embodiment 42

The method of any of Embodiments 23-41, wherein at least two powder compositions are employed and each powder composition has a different mean particle size, thereby forming a polymodal powder composition.

Embodiment 43

A method of manufacturing a three dimensional article comprising the steps of: (1) depositing a quantity of a powder composition including at least one ultrafine, high Tg, spherical thermoplastic polymer powder on a support surface; (2) leveling the composition to form a smooth layer on the support surface; (3) then directing an energy beam over a predetermined target area on the support surface causing the composition to form an integral layer; and (d) repeating steps (1) to (3) to form additional layers that are integrally bonded to adjacent layers to form a three-dimensional article, wherein the thermoplastic composition includes at least one ultrafine, high Tg, spherical thermoplastic powder.

Embodiment 44

The method of claim of the Embodiment 43 wherein the energy beam is a laser.

Embodiment 45

The method of any of the Embodiments 43-44, wherein the at least one ultrafine, high Tg, spherical thermoplastic powder is made by the steps of: (a) dissolving a thermoplastic polymer material in a solvent to form a solution, wherein the thermoplastic polymer is soluble in the solvent, the solvent has a boiling point that is less than 100 C and the solvent is immiscible with water; (b) emulsifying the solution by combining the solution with de-ionized water and a surfactant under agitation conditions sufficient to form an emulsion; (c) transferring the emulsion into a de-ionized receiving water, the receiving water also containing a surfactant and removing the solvent and form a slurry; (d) pre-filtering the slurry to remove any macro particles or contaminates; (e) filtering the slurry to form a wet cake; (f) filtering the slurry to form a wet cake; (g) drying the washed wet cake under heat and vacuum; and (h) recovering particles of thermoplastic polymer powder of less than 75 micron diameter.

Embodiment 46

The method of any of the Embodiments 43-45, wherein the thermoplastic polymer is chosen from polyetherimide, polysulfone, polyarylsulfones, and combinations thereof.

Embodiment 47

A three-dimensional sintered article resulting from the method of any of the Embodiments 1-46.

All ranges disclosed herein are inclusive of the endpoints, and the endpoints are independently combinable with each other. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "some embodiments", "another embodiment", "an embodiment", and so forth, means that a particular element (e.g., feature, structure, and/or characteristic) described in connection with the embodiment is included in at least some embodiments described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A method of manufacturing a three-dimensional article comprising: providing a powder composition including at least one ultrafine, spherical polyetherimide powder having a glass transition temperature (Tg) of at least 150 degrees C.; and powder bed fusing the powder composition to form a three-dimensional article;
wherein the at least one ultrafine, high Tg, spherical polyetherimide powder is made by a process comprising (a) dissolving polyetherimide in an organic solvent capable of dissolving the polyetherimide to form a solution; (b) emulsifying the solution by combining the solution with water and a first surfactant to form an emulsion; (c) transferring the emulsion into a receiving water containing a second surfactant to remove the organic solvent and form a slurry; and (d) recovering polyetherimide particles of less than 75 micron diameter.

2. The method of claim 1, wherein the powder composition comprises between 50 to 100 weight percent of the at least one ultrafine, spherical polyetherimide powder, based on the weight of polymeric materials in the powder composition.

3. The method of claim 1, wherein the spherical polyetherimide powder has a glass transition temperature of more than 150° C. and less than 350° C.

4. The method of any claim 1, wherein the spherical polyetherimide powder has a glass transition temperature of more than 200° C. and less than 300° C.

5. The method of claim 1, wherein the solvent is a member selected from the group of methylene chloride, chloroform, and combinations thereof.

6. The method of claim 1, wherein the surfactant is anionic, cationic or non-ionic surfactant or combinations thereof.

7. The method of claim 1, wherein the polyethermide powder has a weight average molecular weight of between 1,000 and 150,000 Daltons.

8. The method of claim 1, wherein the at least one ultrafine spherical polyetherimide powder is monomodal and has a mean particle of 10 to 75 micron diameter and the amount of powder particles smaller than 10 micron diameter is less than 2 percent by volume.

9. The method of claim 1, further comprising adding a flow agent or to the powder composition.

10. The method of claim 9, wherein the flow agent is chosen from the group consisting of a hydrated silica, amorphous alumina, a glassy silica, a glassy phosphate, a glassy borate, a glassy oxide, titania, talc, mica, a fumed silica, kaolin, attapulgite, calcium silicate, alumina, and magnesium silicate and combinations thereof.

11. The method of claim 9, wherein the amount of the flow agent is from 0.05% to 5% by weight of the powder composition.

12. The method of claim 1, wherein the thermoplastic polymer powder is chosen from polyetherimides, polysulfones, and polyarylsulfones and combinations thereof; and powder bed fusing the powder composition to form a three-dimensional article.

13. The method of claim 1, wherein at least two powder compositions are employed and each powder composition has a different mean particle size, thereby forming a polymodal powder composition.

14. A three-dimensional sintered article resulting from the method of claim 1.

15. A method of manufacturing a three dimensional article comprising the steps of: (1) depositing a quantity of a powder composition including at least one ultrafine, spherical polyethermide powder on a support surface; (2) leveling the composition to form a smooth layer on the support surface; (3) then directing an energy beam over a predetermined target area on the support surface causing the composition to form an integral layer; and (4) repeating steps (1) to (3) to form additional layers that are integrally bonded to adjacent layers to form a three-dimensional article, wherein the powder composition includes at least one ultrafine, spherical polyethermide powder having a glass transition temperature (Tg) of at least 150 degrees C., and wherein the at least one ultrafine, spherical polyethermide powder is made by the steps of: (a) dissolving a thermoplastic polymer material in a solvent to form a solution, wherein the thermoplastic polymer is soluble in the solvent, the solvent has a boiling point that is less than 100° C. and the solvent is immiscible with water; (b) emulsifying the solution by combining the solution with de-ionized water and a first surfactant under agitation conditions sufficient to form an emulsion; (c) transferring the emulsion into a de-ionized receiving water, the receiving water also containing a second surfactant and removing the solvent and form a slurry; (d) pre-filtering the slurry to remove any macro particles or contaminates; (e) filtering the slurry to form a wet cake; (f) filtering the slurry to form a wet cake; (g) drying the washed wet cake under heat and vacuum; and (h) recovering particles of thermoplastic polymer powder of less than 75 micron diameter.

* * * * *